US009922759B2

(12) United States Patent
Bharadwaj

(10) Patent No.: US 9,922,759 B2
(45) Date of Patent: Mar. 20, 2018

(54) ADDITIVE MANUFACTURING OF MAGNETS

(71) Applicant: Apple Inc., Cupertino, CA (US)

(72) Inventor: Shravan Bharadwaj, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/247,723

(22) Filed: Aug. 25, 2016

(65) Prior Publication Data

US 2017/0092400 A1 Mar. 30, 2017

Related U.S. Application Data

(60) Provisional application No. 62/222,944, filed on Sep. 24, 2015.

(51) Int. Cl.
| | |
|---|---|
| *H01F 7/02* | (2006.01) |
| *H01F 41/02* | (2006.01) |
| *H01F 13/00* | (2006.01) |
| *H01F 1/053* | (2006.01) |
| *H01F 1/057* | (2006.01) |

(52) U.S. Cl.
CPC ............. *H01F 7/021* (2013.01); *H01F 1/057* (2013.01); *H01F 1/0536* (2013.01); *H01F 13/003* (2013.01); *H01F 41/0253* (2013.01)

(58) Field of Classification Search
CPC ........ H01F 7/021; H01F 1/0536; H01F 1/057; H01F 13/003; H01F 41/0253
See application file for complete search history.

(56) References Cited

U.S. PATENT DOCUMENTS

| | | | |
|---|---|---|---|
| 2005/0146231 A1* | 7/2005 | Or ............................ | B06B 1/08 310/26 |
| 2013/0176091 A1* | 7/2013 | Lancaster-Larocque .............. | G06F 1/1616 335/306 |
| 2015/0091680 A1* | 4/2015 | Gery ..................... | H01F 13/003 335/284 |
| 2017/0084389 A1* | 3/2017 | Zhu ......................... | H01F 41/02 |

FOREIGN PATENT DOCUMENTS

| | | |
|---|---|---|
| CN | 103854844 A | 6/2014 |
| CN | 104269265 A | 1/2015 |
| CN | 104439244 | 3/2015 |

* cited by examiner

*Primary Examiner* — Bernard Rojas
(74) *Attorney, Agent, or Firm* — Downey Brand LLP

(57) ABSTRACT

A unibody magnetic structure having layers of variably magnetized material is disclosed. The unibody magnetic structure can be formed by way of additive manufacturing, such as by a stereolithographic (SLA) process or a selective laser sintering (SLS) process. The SLA process can involve forming the structure from a molten pool of polymer material, with the material having a magnetic component dissolved therein. The SLS process can involve sintering the structure from a powder having a magnetic component. As each layer is formed, the layer can be selectively magnetized with a given polarity and strength. The magnetization of each formed layer can vary, such that the final structure comprises numerous layers having different shapes and sizes, as well as different levels and polarities of magnetization.

16 Claims, 5 Drawing Sheets

ADDITIVE MANUFACTURING OF MAGNETS

CROSS-REFERENCE TO RELATED APPLICATION

This application claims the benefit of U.S. Provisional Patent Application No. 62/222,944, filed on Sep. 24, 2015, which is incorporated by reference herein in its entirety for all purposes.

FIELD

The described embodiments relate generally to additive manufacturing. More specifically, additive manufacturing is used to form complex magnetic shapes quickly and with little or no waste.

BACKGROUND

Several techniques can be used to "print" a solid object layer by layer. In sintering, a thin layer of powdered metal or thermoplastic is exposed to a laser or electron beam that fuses the material into a solid in designated areas and a new coating of powder is laid on top and the process repeated. Parts can also be built up with heated plastic or metal extruded or squirted through a nozzle that moves to create the shape of one layer, after which another layer is deposited directly on top, and so forth.

SUMMARY

This paper describes various embodiments that relate to forming magnetic parts or structures using various additive manufacturing techniques.

A method of manufacturing a magnetized structure includes the following operations: forming a layer of magnetic material using a forming magnetic field having a forming magnetic field property and having magnetic field lines aligned generally along a longitudinal axis and magnetizing the layer of magnetic material using a magnetizing magnetic field having a magnetizing magnetic field property and having magnetic field lines aligned generally orthogonal to the longitudinal axis. A method of manufacturing a magnetized structure includes the following operations: moving a first layer of sintered magnetic material in accordance with a longitudinal axis, magnetizing the first layer of sintered magnetic material using a first magnetic field, the magnetized first layer of sintered magnetic material characterized as having a first magnetic property, moving a second layer of sintered magnetic material in accordance with the longitudinal axis, the second layer abutting the first layer, magnetizing the second layer of sintered magnetic material using a second magnetic field, the magnetized second layer of sintered magnetic material characterized as having a second magnetic property.

In another embodiment, a unibody magnetic structure having layers of magnetized material is disclosed. Each layer of magnetized material in the unibody structure can be magnetized in the same or different ways than the other layers.

Other aspects and advantages of the invention will become apparent from the following detailed description taken in conjunction with the accompanying drawings, which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Figure 1:
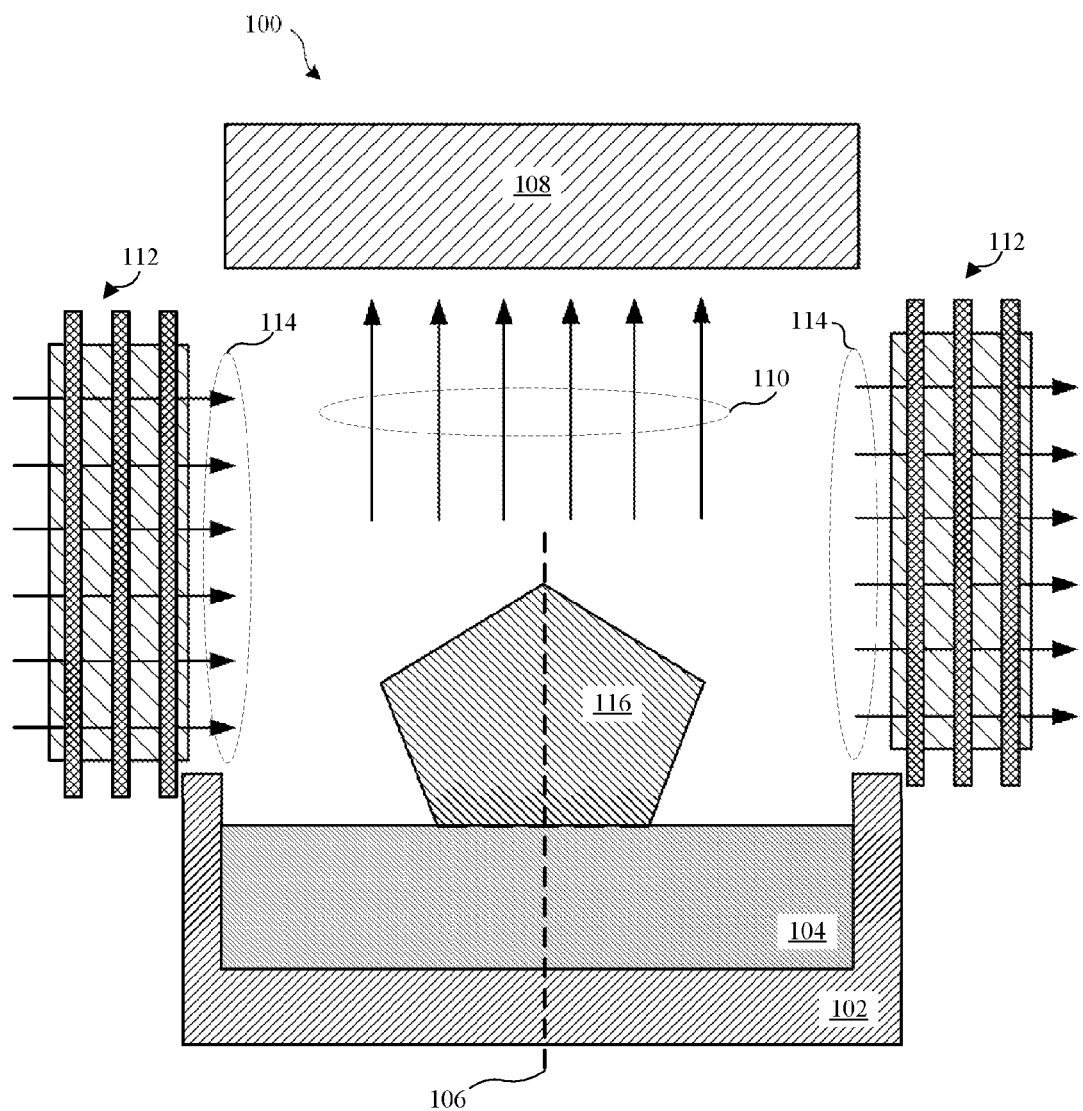
FIG. 1 shows an additive manufacturing apparatus used to form a complex magnetic shape based upon an SLA type 3D manufacturing process in accordance with the described embodiments.

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

There are many well-known additive-manufacturing techniques in use today. One such technique is referred to as selective laser sintering ("SLS") that involves the use of a high power laser (for example, a carbon dioxide laser) to fuse small particles of plastic, metal, ceramic, or glass powders into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed. Because finished part density depends on peak laser power, rather than laser duration, an SLS machine typically uses a pulsed laser. The SLS machine preheats the bulk powder material in the powder bed somewhat below its melting point, to make it easier for the laser to raise the temperature of the selected regions the rest of the way to the melting point.

In one embodiment, a magnetic structure is formed using SLS techniques. More specifically, a laser can be used to sinter powdered magnetic material. In one embodiment, a bed of pre-sinter material in the form of a rare Earth element, such as neodymium, can be fused into a solid part by melting it locally using a focused laser beam. In this way, parts are built up additively layer-by-layer. As each layer is built up, the layer is magnetized using an external magnetic field. In one embodiment, the external magnetic field is a pulsed magnetic field having the ability to align magnetic domains in each layer. In this way, each layer can have a different polarity and level of magnetic saturation. In this way, highly complex geometries and complex magnetic patterns can be created. In one embodiment, the 3D structure can be based upon a 3D reference datum.

In addition to SLS type 3D manufacturing, stereolithographic ("SLA") type manufacturing techniques can be used to create complex structures having correspondingly complex magnetic properties. In one embodiment, a pool of molten magnetic polymer is exposed to a first (growth) magnetic field that attracts the molten magnetic polymer forming a layer that can be magnetized using a second (magnetizing) magnetic field. In this way, as each layer is magnetized, the magnetizing magnetic field can change polarity creating in the process, complex magnetic patterns.

These and other embodiments are discussed below with reference to FIGS. 1-5. However, those skilled in the art will readily appreciate that the detailed description given herein with respect to these figures is for explanatory purposes only and should not be construed as limiting.

FIG. 1 shows additive manufacturing apparatus 100 used to form a complex magnetic shape based upon SLA type 3D manufacturing in accordance with the described embodiments. Apparatus 100 can include receptacle 102 used to store magnetic polymer material 104. In one embodiment, receptacle 102 can be characterized as having longitudinal axis 106. In one embodiment, receptacle 102 can heat magnetic polymer material such that magnetic polymer material melts and forms a pool of magnetic polymer material 104. In this way, magnetic polymer material 104, in the molten state, can more easily be formed into desired shapes having desired sizes. Magnetic polymer material 104 can be any polymer, resin, or other material suitable for SLA type 3D printing or manufacturing. This polymer material can include a metal suitable for magnetizing dissolved therein. For example, magnetic polymer material 104 can include a rare earth metal such as neodymium, a ferrite alloy, or any other magnetizable material. This metal can then be magnetized during the formation process.

Apparatus 100 can also include first system magnet 108 arranged to provide magnetic field 110 having magnetic field lines aligned with longitudinal axis 106. Apparatus 100 can also include second system magnet 112 arranged to provide magnetic field 114. In the described embodiment, magnetic field 114 has magnetic field lines that are generally orthogonal to longitudinal axis 106. In one embodiment, first system magnet 108 can be a permanent magnet in which case, magnetic field 110 is a static magnetic field having a fixed magnetic field strength and fixed magnetic polarity with respect to the pool of magnetic polymer material 104. In one embodiment, first system magnet 108 can be a variable magnet, such as an electromagnet, in which case the magnetic field strength and polarity can change. For example, when first system magnet 108 is an electromagnet, then the magnetic field strength and magnetic polarity can depend upon a current and a current direction used to induce magnetic field 110.

In one embodiment, second system magnet 112 can be a permanent magnet in which case, magnetic field 114 is a static magnetic field having a fixed magnetic field strength and fixed magnetic polarity with respect to the pool of magnetic polymer material 104. In one embodiment, second system magnet 112 can be a variable magnet, such as an electromagnet, in which case the magnetic field strength and polarity can change. For example, when second system magnet 112 is an electromagnet, then the magnetic field strength and magnetic polarity can depend upon a current and a current direction used to induce magnetic field 114. It should be noted that first system magnet 108 and second system magnet 112 can be independent of each other in that one can be a permanent magnet and the other an electromagnet.

During an additive manufacturing operation, first system magnet 108 can provide a magnetic field 110 having a direction and magnetic field strength sufficient to magnetically attract at least portion 116 of the pool of magnetic polymer material 104 in a direction generally parallel to longitudinal axis 106. In one embodiment, as magnetic field 110 pulls hardened portion 116 from an amount of magnetic polymer material 104 remaining in receptacle 102, second system magnet 112 can provide second magnetic field 114. In one embodiment, second magnetic field 114 can have magnetic field lines that that are generally perpendicular to longitudinal axis 106, and as such can magnetize the magnetic material 104 such that most of the magnetic domains during a magnetization period (i.e., a period of time that second system magnet 112 is providing second magnetic field 114) are aligned with second magnetic field 114. In some embodiments, second magnetic field 114 can change magnetic polarity and/or magnetic field strength. In this way, different portions of a finished structure can have varying magnetic field properties. For example, if second magnetic field 114 changes such that material 104 is exposed to alternating magnetic polarities as it is being pulled up into hardened portion 116, then the finished structure will also include an alternating magnetic pattern corresponding to the change of second magnetic field 114. In this way, any changes of magnetic field properties can be "frozen" into hardened portion 116 as it is formed into a solid manufactured magnet.

In various embodiments, magnetic field 110 can be varied according to a desired final shape of the finished structure. Such a finished structure can be a customized magnet having a specific shape and specifically magnetized material. The finished structure for the manufactured magnet can resemble that which is shown for portion 116, as this portion is pulled up from the molten magnetic material 104 and hardened during the SLA manufacturing process. In some embodiments, first system magnet 108, which can be a plurality of magnets if desired, can function to provide a magnetic field that varies as hardened portion 116 is pulled from material 104. As shown, a stronger or wider area magnetic field 110 for a given layer can result in some layers of portion 116 that are wider than others, while a varied weaker or narrower area magnetic field 110 for a given layer can result in other layers of hardened portion 116 that are narrower than others. Custom and more complex shapes for the structure of the finished product can similarly be formed.

Figure 2:
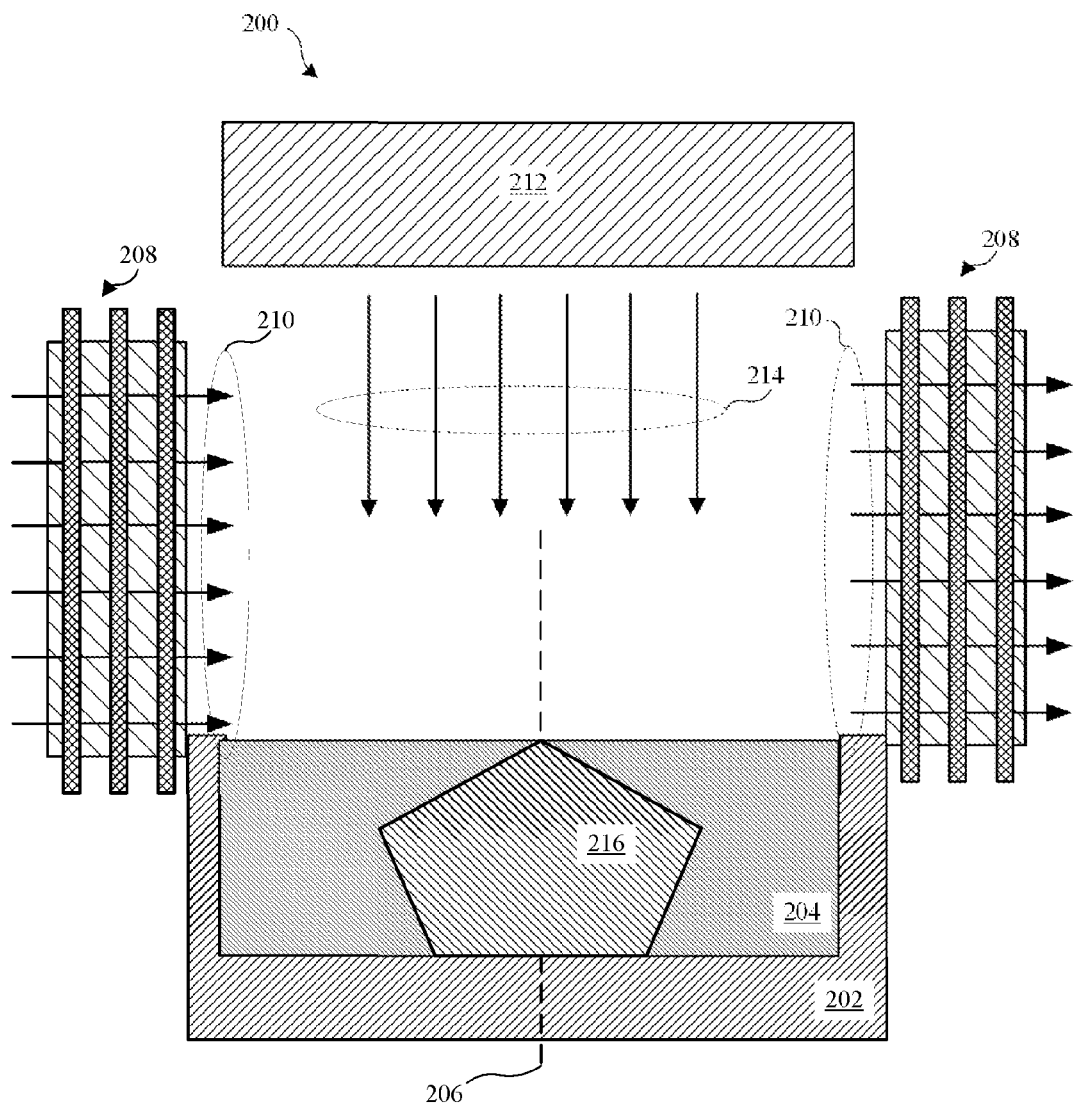
FIG. 2 shows an additive manufacturing apparatus used to form a complex magnetic shape based upon an SLS type 3D manufacturing process in accordance with the described embodiments.

FIG. 2 shows additive manufacturing apparatus 200 used to form a complex magnetic shape based upon selective laser sintering (SLS) type 3D manufacturing in accordance with the described embodiments. Apparatus 200 can include receptacle 202 used to store magnetic pre-sinter material 204. In one embodiment, magnetic pre-sinter material can take the form of powdered rare Earth element such as neodymium. Of course, other materials can also be used, such as a ferrite alloy powder, for example. In one embodiment, receptacle 202 can be characterized as having longitudinal axis 206. In one embodiment, receptacle 202 can heat magnetic pre-sinter material 204. In this way, magnetic polymer material 204 can more easily be formed into desired shapes having desired sizes. Apparatus 200 can also include system magnet 208 arranged to provide magnetic field 210 having magnetic field lines aligned generally orthogonal to longitudinal axis 206. Apparatus 200 can also include laser 212 arranged to provide laser energy 214 directed along longitudinal axis 206 and impacting magnetic pre-sinter material 204. In this way, laser energy 214 can sinter, layer-by-layer, magnetic pre-sinter material 204 creating in the process a layered sintered structure 216 of sintered magnetic material 204. As will be readily appreciated, new layers of more magnetic pre-sinter material can be added atop the existing pre-sintered material 204 and layered sintered structure 216, as may be typical for a given SLS type process.

In one embodiment, magnetic field 210 can have magnetic field lines that that are generally perpendicular to longitudinal axis 206 and as such can magnetize the magnetic material 204 such that some or all of the magnetic domains during a magnetization period (i.e., a period of time that system magnet 208 is providing magnetic field 210) are aligned with magnetic field 210. In some embodiments, magnetic field 210 can change magnetic polarity and/or magnetic field strength. In this way, different portions of a finished structure can have varying magnetic field properties. For example, if magnetic field 210 changes such that material in the layered sintered structure 216 is exposed to alternating magnetic polarities, then the finished structure will also include an alternating magnetic pattern corresponding to the change of second magnetic field 210. In this way, any changes of magnetic field properties can be "frozen" into the layered sintered structure 216.

Figure 3:
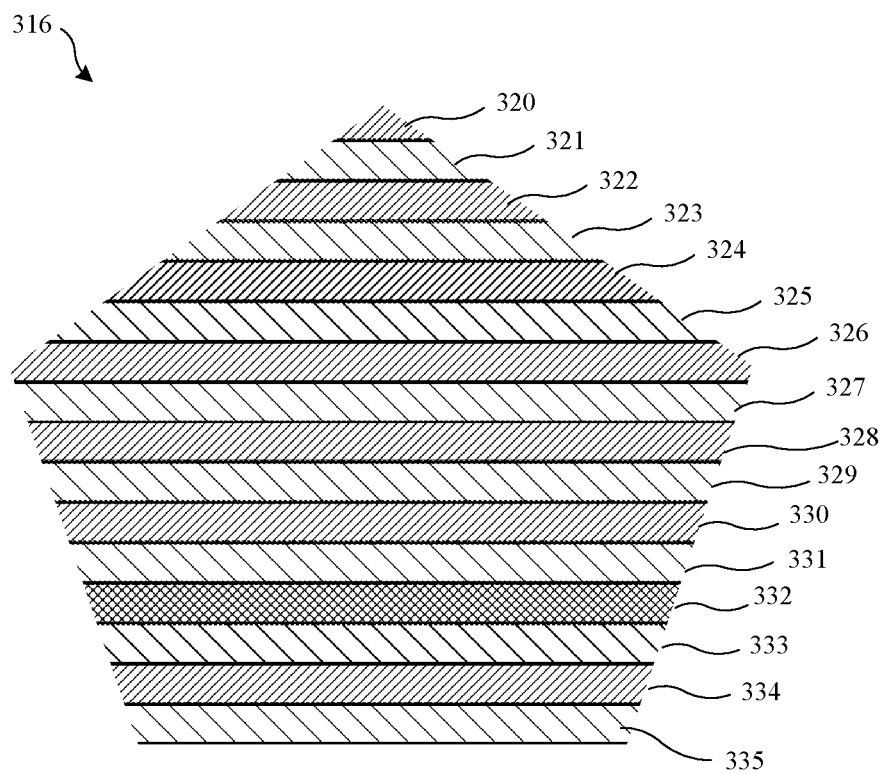
FIG. 3 shows a complex magnetic shape formed by either of the foregoing SLA or SLS type 3D manufacturing processes in accordance with the described embodiments.

FIG. 3 shows a complex magnetic shape formed by either of the foregoing SLA or SLS type 3D manufacturing processes in accordance with the described embodiments. Complex magnetic shape 316 can be formed layer by layer, as described in either of the SLA or SLS type 3D processes set forth above. For example, complex magnetic shape 316 can be a finished product of hardened portion 116 or layered sintered structure 216 set forth above. Each of layers 320-335 in complex magnetic shape 316 may be formed of the same material, which again can include a rare earth metal such as neodymium, a ferrite alloy, or any other magnetizable material. While formed of the same material, each of layers 320-335 can be magnetized differently, and may have differing polarities and/or strengths with respect to each other. Such a differing magnetization for each layer can be a result of magnetizing each layer differently as each layer is separately formed in the overall formation of complex magnetic shape 316, as set forth in both of the SLA and SLS type processes described above.

As shown in FIG. 3, each of even numbered layers 320, 322, 324, 326, 328, 330, and 334 can have a first polarity and strength, while each of odd numbered layers 321, 323, 325, 327, 329, 331, 333, and 335 can have a second polarity and strength. For purposes of simplicity in illustration, the magnetized strength or magnitude can be the same for each of these foregoing layers, while the polarity alternates from layer to layer. Layer 332 can have the same first polarity as the other even numbered layers, but can have a strength or magnitude that is greater or less than that of the other even numbered layers. Although layer 332 shown as the only layer having a different strength, it will be readily appreciate that each layer can have a different strength than every other layer. Alternatively, multiple layers may have the same strength, while multiple other layers differ, as may be desired in a finished complex magnetic shape.

Figure 4:
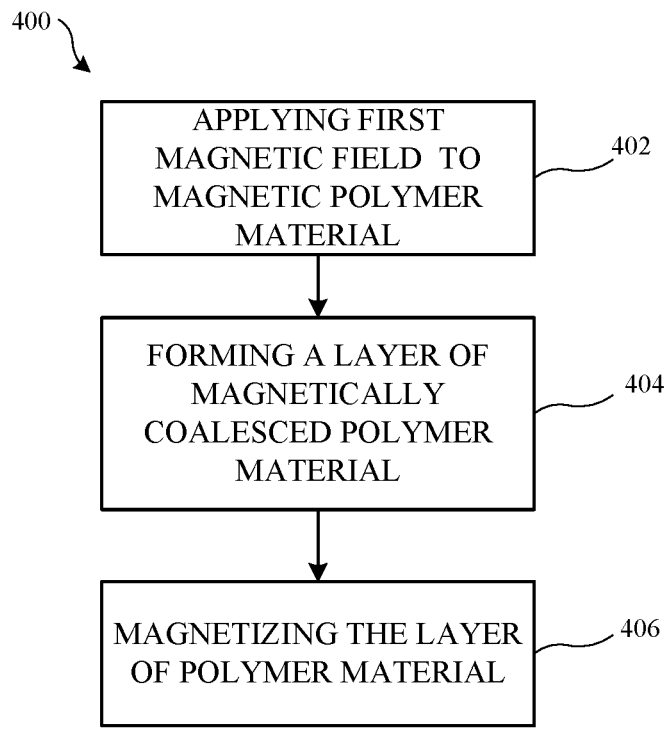
FIG. 4 is a flowchart detailing an SLA additive magnetic manufacturing process in accordance with the described embodiments.

FIG. 4 is a flowchart detailing a SLA additive magnetic manufacturing process in accordance with the described embodiments. Process 400 can start at step 402, by applying a first magnetic field to a magnetic polymer material. As noted above, this can be at a surface of a pool of molten magnetic polymer material. The next step 404 can involve forming a layer of magnetically coalesced polymer material, such as what happens when a portion of the molten material is pulled up from the molten material pool. Such a layer can be very thin, as numerous incremental layers are formed in a typical SLA process. Step 406 can then involve magnetizing the layer of magnetic polymer material. Again, such a magnetization can vary for each layer, such that the final structure has numerous layers that all have varying magnetizations by polarity and/or strength. Alternatively, a homogenous or similar magnetization of each layer can be had. Steps 402-406 can then be repeated for each layer of material as the product structure is formed.

Figure 5:
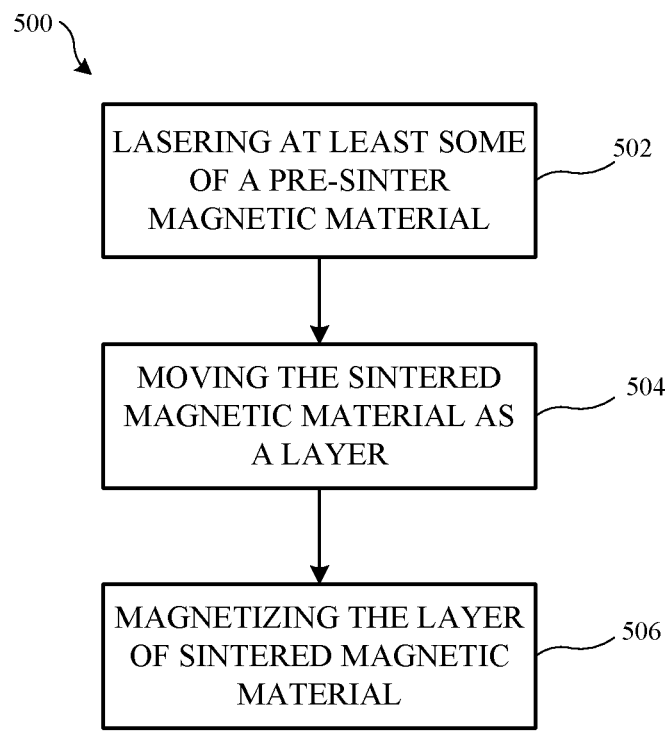
FIG. 5 is a flowchart detailing an SLS additive magnetic manufacturing process in accordance with the described embodiments.

FIG. 5 is a flowchart detailing a SLS additive magnetic manufacturing process in accordance with the described embodiments. Process 500 can start at step 502, by lasering (laser sintering) at least some of a pre-sinter magnetic material. Again, such a material can be a metallic powder, which can be neodymium, ferrite alloy, or the like. Step 504 can involve moving the sintered magnetic material as a layer. This can involve moving the entire partially formed structure, such that another powder layer can be applied for sintering. Step 506 can then involve magnetizing the layer of sintered magnetic material. Again, such a magnetization can vary for each layer, such that the final structure has numerous layers that all have varying magnetizations by polarity and/or strength. Alternatively, a homogenous or similar magnetization of each layer can be had. Steps 502-506 can then be repeated for each layer of material as the product structure is formed. Additional steps are not show for purpose of simplicity, and it will be understood that such additional steps may still be performed. For example, a layer of loose powder can be applied to the top of the partially formed structure before step 502 is performed.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

A method of manufacturing a magnetized structure includes the following operations: forming a layer of magnetic material using a forming magnetic field having a forming magnetic field property and having magnetic field lines aligned generally along a longitudinal axis and magnetizing the layer of magnetic material using a magnetizing magnetic field having a magnetizing magnetic field property and having magnetic field lines aligned generally orthogonal to the longitudinal axis. In one embodiment, the magnetized layer of magnetic material is characterized as having a magnetic layer property. In one embodiment, the magnetic layer property corresponds to a superposition of the forming magnetic field property and the magnetizing magnetic field property. In one embodiment, the layer of magnetic material is a first layer of magnetic material and wherein the magnetized layer is a first magnetized layer characterized as having a first magnetic layer property and the method further includes forming a second layer of magnetic material using the forming magnetic field, wherein the second layer of magnetic material abuts the first layer of magnetic material and magnetizing the second layer of magnetic material using the magnetizing magnetic field. In one embodiment the first magnetic field property corresponds to an amount of the magnetic material in the formed layer. In one embodiment, forming of the layer of magnetic material and magnetizing the layer of magnetic material are carried out at different times. In one embodiment, forming magnetic field is provided by at least a permanent magnet. In one embodiment, the magnetizing magnetic field is provided by an electromagnet.

A method of manufacturing a magnetized structure includes the following operations: moving a first layer of sintered magnetic material in accordance with a longitudinal axis, magnetizing the first layer of sintered magnetic material using a first magnetic field, the magnetized first layer of sintered magnetic material characterized as having a first magnetic property, moving a second layer of sintered magnetic material in accordance with the longitudinal axis, the second layer abutting the first layer, magnetizing the second layer of sintered magnetic material using a second magnetic field, the magnetized second layer of sintered magnetic material characterized as having a second magnetic property. In one embodiment, the first magnetic property comprises a first magnetic polarity and wherein the second magnetic property comprises a second magnetic polarity opposite the first magnetic polarity. In one embodiment, the first magnetic property comprises a first magnetization level and wherein the second magnetic property comprises a second magnetization level. In one embodiment, the first and second magnetization levels are different. The method also includes using a laser to form the first and second sintered layers of sintered magnetic material.

A unibody magnetic structure having layers of variably magnetized material is described and at least one embodiment includes at least some of the layers that are adjacent to each other have opposing magnetic polarities. At least one embodiment includes at least some of the layers that are adjacent to each other have different magnetic strengths. One embodiment includes the unibody magnetic structure comprises magnetic polymer material. One embodiment, includes the unibody magnetic structure comprises sintered rare earth material. One embodiment includes the sintered rare earth material comprises neodymium. One embodiment includes the unibody magnetic structure is formed by laser sintering. various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of manufacturing a monolithic magnetic element having a first and a second magnetized layer, the method comprising:
    causing at least some magnetizable material retained in a receptacle to move out from the receptacle by applying a forming magnetic field thereto, wherein the receptacle defines a longitudinal axis and the forming magnetic field includes forming magnetic field lines generally parallel to the longitudinal axis;
    during the movement of the magnetizable material:
    forming the first magnetized layer by applying a magnetizing magnetic field to a first portion of the moving magnetizable material, wherein the magnetizing magnetic field includes magnetizing magnetic field lines aligned generally orthogonal to the longitudinal axis; and
    forming the second magnetized layer by applying the magnetizing magnetic field to a second portion of the moving magnetizable material, wherein the movement of the first and second portions of the magnetizable material during the forming of the first and second magnetized layers results in a continuous transition zone between the first and second magnetized layers.

2. The method as recited in claim 1, wherein when a magnetic characteristic of the magnetizing magnetic field is changed prior to being applied to the second portion, the changed magnetic characteristic is imparted to the second magnetized layer.

3. The method as recited in claim 2, prior to forming the second magnetized layer, a magnetic polarity of the magnetizing magnetic field is changed from a first magnetic polarity to a second magnetic polarity opposite the first magnetic polarity such that the second magnetic polarity is imparted to the second magnetized layer.

4. The method as recited in claim 2, prior to forming the second magnetized layer, the magnetizing magnetic field is absent, the second magnetized layer is imparted with a magnetic characteristic of the forming magnetic field.

5. The method as recited in claim 4, wherein a magnetic direction of the first magnetized layer and the second magnetized layer are generally orthogonal to each other.

6. The method as recited in claim 1, wherein the continuous transition zone comprises a superposition of respective magnetic characteristics of the first and second magnetized layers.

7. The method as recited in claim 1, wherein the monolithic magnetic element lacks any internal surfaces.

8. The method as recited in claim 1, wherein the magnetizing magnetic field is provided by an electromagnet.

9. A method of manufacturing a magnetized structure that includes a first magnetized sub-structure and a second magnetized sub-structure, comprising:
 forming the first magnetized sub-structure by sintering a first amount of pre-sinter magnetizable material, the pre-sinter magnetizable material being retained in a receptacle that defines a longitudinal axis;
 applying a magnetizing magnetic field to the first amount of sintered magnetizable material, wherein the magnetizing magnetic field includes magnetic field lines generally orthogonal to the longitudinal axis; and
 forming the second magnetized sub-structure by sintering a second amount of the pre-sinter magnetizable material such that the first and second sub-structures form a unitary body and applying the magnetizing magnetic field to the second amount of sintered magnetizable material.

10. The method as recited in claim 9, wherein the magnetizing magnetic field imparts a magnetic property to the magnetized sub-structures.

11. The method as recited in claim 9, further comprising:
 using a laser to sinter the pre-sinter magnetizable material.

12. The method as recited in claim 10, wherein a magnetic polarity of the first magnetic substructure is a first polarity and wherein the magnetic polarity of the second sub-structure is a second polarity that is different than the first polarity.

13. The method as recited in claim 10, wherein a magnetic direction of the first magnetic substructure is a first direction and wherein the magnetic direction of the second sub-structure is a second direction that is different than the first direction.

14. The method as recited in claim 13, wherein the first magnetic direction and the second magnetic direction or orthogonal to each other.

15. The method as recited in claim 13, wherein the first magnetic direction and the second magnetic direction or anti-parallel to each other.

16. The method as recited in claim 9, forming a third magnetized sub-structure by sintering a third amount of the pre-sinter magnetizable material such that the second and third sub-structures form a unitary body and applying the magnetizing magnetic field to the third amount of sintered magnetizable material.

\* \* \* \* \*